United States Patent
Lehmann

(10) Patent No.: US 12,454,071 B2
(45) Date of Patent: Oct. 28, 2025

(54) PIE AND CAKE CUTTING GUIDE

(71) Applicant: David Lehmann, San Diego, CA (US)

(72) Inventor: David Lehmann, San Diego, CA (US)

( * ) Notice: Subject to any disclaimer, the term of this patent is extended or adjusted under 35 U.S.C. 154(b) by 0 days.

(21) Appl. No.: 18/917,962

(22) Filed: Oct. 16, 2024

(65) Prior Publication Data

US 2025/0121522 A1    Apr. 17, 2025

Related U.S. Application Data

(60) Provisional application No. 63/544,416, filed on Oct. 16, 2023.

(51) Int. Cl.
  *B26B 29/06*  (2006.01)

(52) U.S. Cl.
  CPC ................ B26B 29/063 (2013.01)

(58) Field of Classification Search
  CPC ..................................... B26B 29/063
  See application file for complete search history.

(56) References Cited

U.S. PATENT DOCUMENTS

| | | | | | |
|---|---|---|---|---|---|
| 2,487,234 | A | * | 11/1949 | Gore | B26D 3/24 33/525 |
| 3,060,838 | A | * | 10/1962 | Priore | A21C 15/04 99/DIG. 15 |
| 3,380,169 | A | * | 4/1968 | Ungar | B26D 3/245 33/525 |
| D246,411 | S | * | 11/1977 | Blanchard | D7/673 |
| 4,100,676 | A | * | 7/1978 | Ferguson | A47G 19/022 33/525 |
| 5,007,743 | A | * | 4/1991 | Brennan | A47G 19/027 73/426 |
| D316,655 | S | * | 5/1991 | Buday | D7/673 |
| D331,524 | S | * | 12/1992 | Buday | D7/673 |
| 10,667,652 | B2 | * | 6/2020 | Getzinger | B26B 29/063 |
| 2006/0272466 | A1 | * | 12/2006 | Atwater | B26D 3/24 83/932 |
| 2012/0210841 | A1 | * | 8/2012 | Getzinger | B26D 3/24 269/295 |
| 2013/0036882 | A1 | * | 2/2013 | Getzinger | B26D 3/245 269/295 |
| 2015/0134571 | A1 | * | 5/2015 | Getzinger | A47G 19/022 269/295 |
| 2017/0079474 | A1 | * | 3/2017 | Stephen | A23P 30/10 |
| 2019/0174772 | A1 | * | 6/2019 | Walters | B26D 3/24 |
| 2019/0224876 | A1 | * | 7/2019 | Getzinger | A47J 47/005 |
| 2019/0274317 | A1 | * | 9/2019 | Graubert | B26B 3/04 |
| 2025/0121522 | A1 | * | 4/2025 | Lehmann | B26B 29/063 |

FOREIGN PATENT DOCUMENTS

CN       108928570 B * 12/2019 .......... B65D 11/00

* cited by examiner

*Primary Examiner* — Yaritza Guadalupe-McCall

(74) *Attorney, Agent, or Firm* — Donn K. Harms

(57) ABSTRACT

A pie and cake cutting sectioning device is provided having a circular body adapted for positioning upon a pie or cake. A plurality of sectional markers which are located on the sectioning body have openings therein allowing for sliding toothpicks or the like in radial lines into the pie or cake. Upon removal of the circular body from the top of the pie or cake the toothpicks provide guide lines for cutting it into equal sections.

6 Claims, 4 Drawing Sheets

PIE AND CAKE CUTTING GUIDE

This application claims priority to U.S. Provisional Patent Application Ser. No. 63/544,416 filed on Oct. 16, 2023.

BACKGROUND OF THE INVENTION

1. Field of the Invention

The invention herein disclosed relates generally to confectionaries, such as pies and cakes. More particularly, it relates to a removably positionable guide for the marking of pies and cakes and the like to be sliced into substantially equal sections.

2. Prior Art

Background of the Invention

A frequent issue with the provision of cakes and pies and even pizzas for eating by eager diners is the ongoing problem of dividing the food presented into substantially equal portions. Conventionally, such cakes and pies, when presented for consumption, are round and are of a size not easily consumed by a single person. Consequently, the division of the pie or cake into sections sized for easy re-plating and consumption is required.

Conventionally, when dividing up a round cake or pie or other food, which is formed circular or round, a designated person will employ a knife to form radial sections of the pie or cake which surround or extend from a center area of the cake or pie. However, this conventional method of employing a knife and the eye of the cutter to form individual sections of the pie frequently results in unevenly formed sections. It also leaves the cutting into a desired number of sections up to the estimation of the person cutting the pie or cake. This frequently results in the wrong number of sections being formed from the pie or cake for the number of persons to be served.

With respect to the above, before explaining at least one preferred embodiment of the pie and cake cutting guide device and method herein, it is to be understood that the disclosed device herein is not limited in its application to the details of employment and to any arrangement of steps set forth in the following description or illustrated in the drawings. The various apparatus components and configurations and methods of employment thereof as herein disclosed, are capable of other embodiments, and of being practiced and carried out in various ways, all of which will be obvious to those skilled in the art subsequent to the review of this specification.

Also, it is to be understood that the phraseology and terminology employed herein are for the purpose of description for an understanding of the pie and cake cutting guide device and system herein and should not be regarded as limiting. As such, those skilled in the art will appreciate that the conception upon which this disclosure is based may readily be utilized as a basis for other guide devices for sectioning pies and cakes. It is important, therefore, that the embodiments, objects and claims herein, be regarded as including such equivalent construction and methodology insofar as they do not depart from the spirit and scope of the present invention.

SUMMARY OF THE INVENTION

The apparatus and system herein provides for an improved apparatus and method for the guiding of a user in the easy and accurate sectioning of pies and cakes. The device herein provides the user with a plurality of choices as to a desired number of sections into which the pie or cake may be cut. This allows the user to decide if they need to cut the pie or cake into four sections, six sections, eight sections, ten sections, or where desired, an odd number of individual sections of pie or cake or the like and employ the device herein to accomplish that task.

In one mode of the device herein, individual sectioning bodies are provided to the user in a kit of component sectioning bodies which allows the user to choose the one component sectioning body from the kit having the desired number of total sections into which a cake or pie is to be cut. While shown herein as individual sectioning bodies, which have even numbers of sections depicted, the device herein may be configured with sectioning bodies having any odd or even number of sections to which a pie or cake may be cut.

The individual sectioning bodies are formed with radial members defining sections therebetween. The radial members extend from a center point of the sectioning body to a perimeter edge thereof. The circular perimeter edge of the body of the device, where the circumference thereof substantially equals that of the pie or cake to be divided, preferably includes openings sized for either cutting the perimeter of the pie or cake or for the insertion of section markers, such as toothpicks therein. By substantially equal is meant that the circumference of the device is equal to or slightly smaller or slightly larger than that of the pie or cake to be cut. This configuration allows the user to place the sectioning body atop the pie or cake, and either form guide cuts into the perimeter edge of the pie or cake, or to insert markers such as toothpicks at the individual openings along the radial members defining guide markers or around the perimeter edge.

In another mode of the device, the sectioning body has openings allowing it to be employed upon a pie or cake which has a circumference smaller than that of the sectioning body. In this mode of the device, radially extending members extend from the center of the sectioning body to the perimeter edge thereof. The openings are formed through the radially extending members allowing for insertion therethrough of markers, such as toothpicks, into the pie or cake. The sectioning body may then be removed, leaving the inserted markers to be employed as guides for the user to employ a knife to form even sections.

Where a kit of differently configured component sectioning bodies is not desirable, the device herein has a mode of configuration allowing for a single sectioning body. In this mode of the device, the sectioning body has indicia thereon, which provides a guide to the user for any of a plurality of different choices as to the number of sections a pie or cake may be cut.

In this mode, a substantially planar body of the device may have linear indicia thereon designating numbers of equal sections. Preferably, at the perimeter edge of the body where each segment of linear indicia intersects the perimeter, a notch or recess or passage is formed. In this mode of the device, the user may situate the sectioning body atop the desired pie or cake and then choose the number of sections desired to be cut from that pie or cake. Using the indicia upon the sectioning body correlating to the chosen number of sections, the user may mark the perimeter edge of the pie or cake with cut lines therein, or they may position markers, such as toothpicks, at those points.

As with the kit version of the device, the single body version may also include spaced marker openings along each of the lines positioned on the body. This allows the user to insert markers, such as toothpicks, through the openings along each of the chosen cut lines. Once the body of the device is removed from atop the pie or cake, the user may employ a knife to cut sections using the toothpicks or inserted markers as guides for each line.

With respect to the above summary description, before explaining at least one preferred embodiment of the knife sharpening device system herein, it is to be understood that the invention is not limited in its application to the details of operation nor the arrangement of the components or the steps set forth in the following description or illustrations in the drawings. The various methods of implementation and operation of the pie and cake cutting guide device and method herein, are capable of other embodiments and of being practiced and carried out in various ways which will be obvious to those skilled in the art upon their review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis by others for designing of other modes for carrying out the several purposes of the present pie and cake cutting guide device and system. Therefore, the objects and claims herein should be regarded as including such equivalent construction, steps, and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Where used herein, if not otherwise defined, the term "substantially" means plus or minus five percent.

It is an object of this invention to provide a guide component allowing for the easy substantially equal sectioning and subsequent cutting of pies and cakes.

It is a further object of this invention to provide such a pie and cake cutting guide apparatus which provides the user an easy manner to discern and mark the pie and cake of choice to be cut to the number of sections of choice.

It is yet another object of this invention to provide such a pie and cake cutting guide which is configured to allow marking and sectioning of pies and cakes having a circumference equal to or smaller or larger than the circumference of the sectioning body.

These together with other objects and advantages, which become subsequently apparent, reside in the details of the construction and operation of the disclosed pie and cake cutting guide device and system herein as more fully hereinafter described and claimed, reference being had to the accompanying drawings forming a part thereof, wherein like numerals refer to like parts throughout.

Further objectives of this invention may be ascertained by those skilled in the art as brought out in the following part of the specification wherein detailed description is for the purpose of fully disclosing the invention without placing any limitations thereon.

BRIEF DESCRIPTION OF DRAWING FIGURES

The accompanying drawings, which are incorporated herein and form a part of the specification, illustrate some but not the only or exclusive examples of embodiments and/or features of the disclosed pie and cake cutting guide device and method herein. It is intended that the embodiments and figures disclosed herein are to be considered illustrative of the invention herein, rather than limiting in any fashion.

DETAILED DESCRIPTION OF THE PREFERRED EMBODIMENTS OF THE INVENTION

Figure 1:
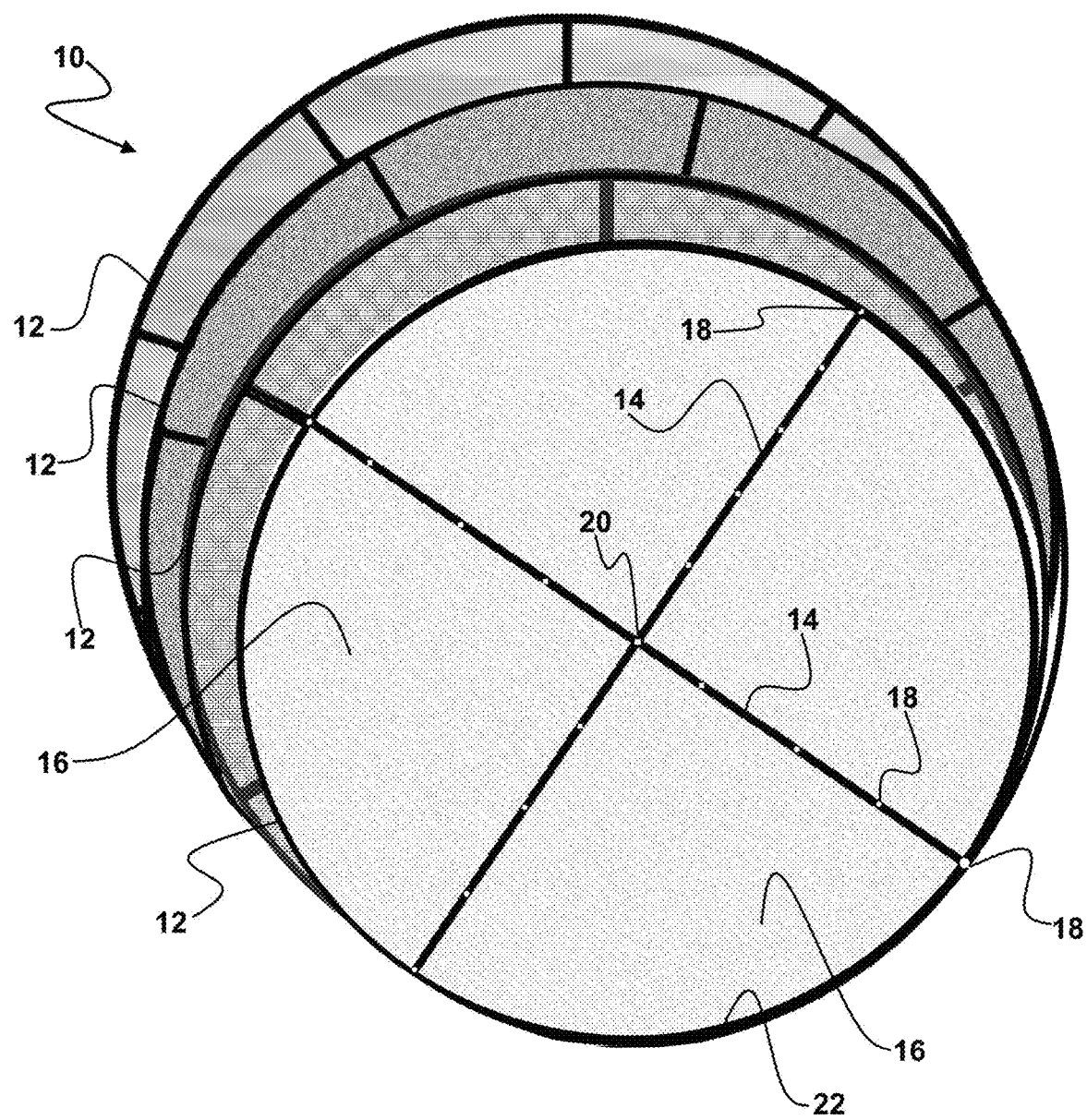
FIG. 1 shows the device in a preferred stacked kit form having a plurality of individual component sectioning bodies where each has markings or indicia thereon identifying a different number of sections to be formed with the sectioning body from a chosen cake or pie and/or had a differing radius.

In this description, the directional prepositions of up, upwardly, down, downwardly, front, back, top, upper, bottom, lower, left, right, first, second, and other such terms refer to the pie and cake cutting guide and components thereof as they are oriented and appear in the drawings and all such terms are used for convenience only and such are not intended to be limiting or to imply that the pie and cake cutting guide device and system has to be used or positioned in any particular orientation.

Figure 2:
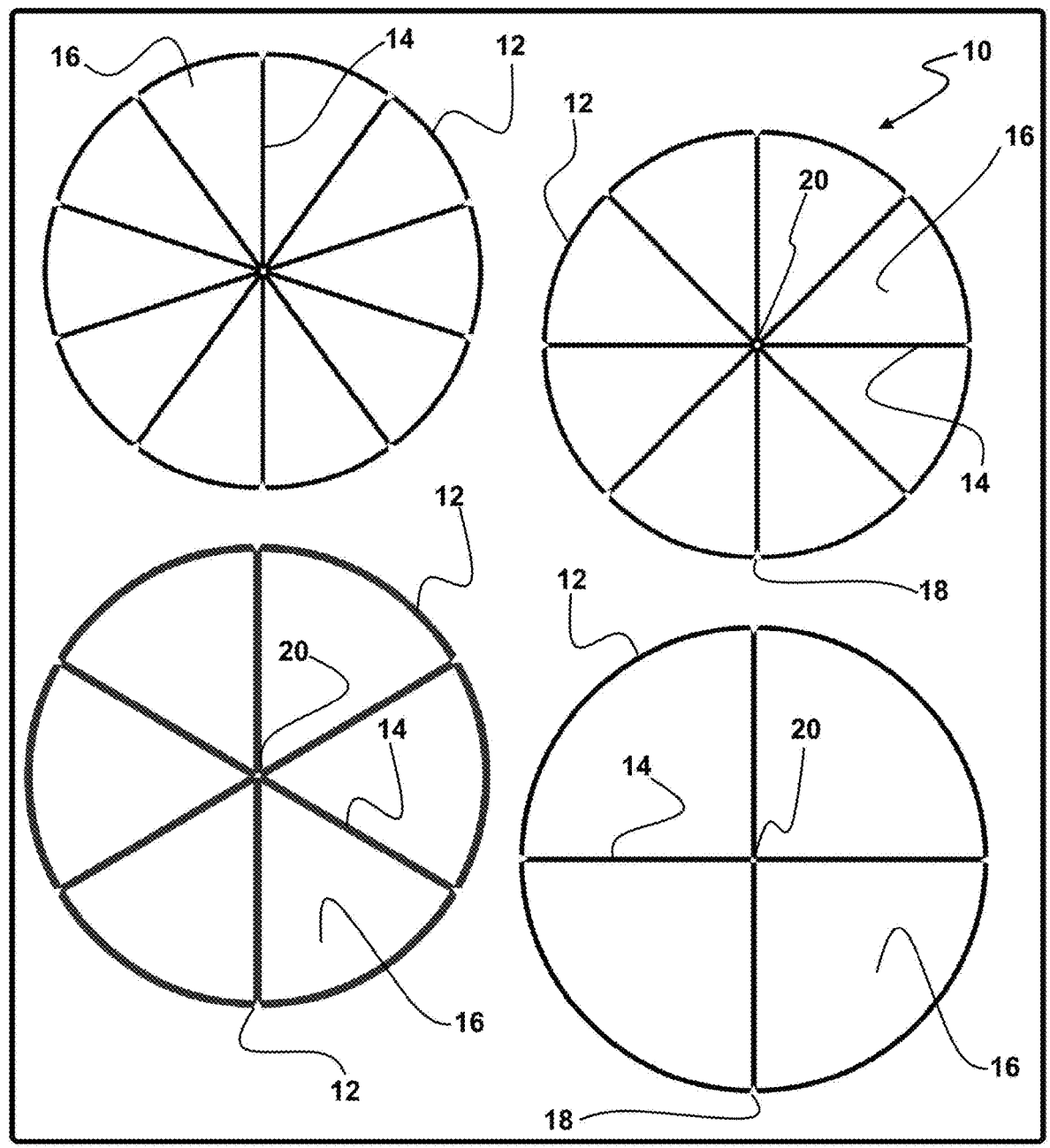
FIG. 2 shows examples of the members of the kit of FIG. 1, wherein the sectioning bodies have discernable sections therein, and which may have openings on or at the intersection of the radially disposed members and the circumference of the sectioning body.

Now referring to drawings in FIGS. 1-4, there is seen in FIGS. 1 and 2 a kit mode of the device 10 herein. As shown, a plurality of individual sectioning bodies 12 are provided. The sectioning bodies 12 are preferably configured to be substantially planar and may be formed of any suitable material, such as a polymeric material, for ease of manufacture or a metal material for strength or combinations thereof.

In this mode, each sectioning body 12 has indicia or sectional markers 14 thereon, which provides a cutting sectioning to the user for a determined number of sections 16 into which a pie or cake or the like may be marked and cut. The sectional markers 14 may be formed by radially extending members or by printed indicia upon the sections 16. Therefor, by sectional marking or markers herein is meant printed indicia or physical markings upon the section 16 area or structural components, such as radially extending elongated members in between the sections 16, which provide the user with an easily discernable limit between each of the sections 16 therebetween and the ability to discern how many sections the cake or pie will be cut into by the employed sectioning body 12.

Also shown in FIG. 1 are a plurality of openings 18 which are formed along the sectional markers 14. These openings may be employed by the user for insertion of position markers, such as conventional toothpicks, therethrough, into the underlying pie or cake when the sectioning body 12 is in a marking position (FIG. 4) having a bottom surface of the sectioning body 12 positioned atop the pie 11 or cake being divided. Where the sectional markers 14 are radially extending members, the openings 18 will communicate therethrough. Where the sectional markers 14 are indicia such as ink, coamings, decals, or other markings located upon the area of the device 10 defining sections 16, the openings will communicate through the material forming the sections 16 along the lines defined by the sectional markers 14 positioned thereon.

The sectioning body 12 is lifted from the marking position and slid off the position markers, once the position markers have been inserted into the pie or cake, wherein they will be left in the pie or cake as sections for linear cuts from the center 20 to the perimeter 22 edge. The openings 18 also allow use of the sectioning body 12 where it has a perimeter 22 larger than that of the underlying pie or cake. The user may simply position markers, such as toothpicks, through the openings 18 closest to the larger or smaller perimeter edge of the pie or cake, and then use them to cut the number of chosen sections, once the sectioning body 12 is removed, by sliding it upward and off the toothpicks or other stick-like position markers adapted to slide through the openings 18 and into the underlying cake or pie or the like.

Figure 3:
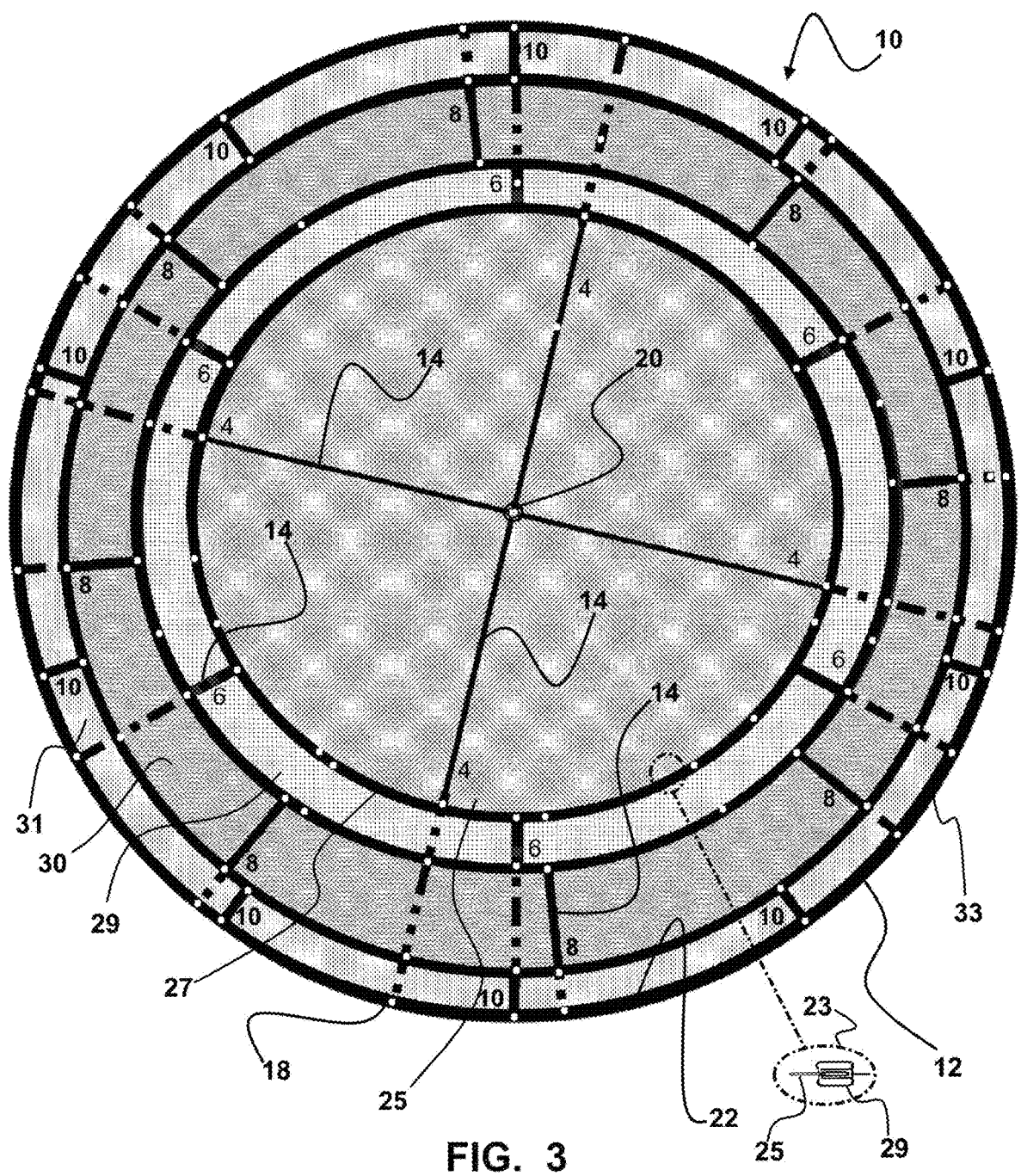
FIG. 3 depicts a mode of the device herein, wherein a single substantially planar sectioning body having indicia thereon designating a central section which may rotate which is surmounted by annular sectional divisions and also having openings for markers, such as toothpicks.
Figure 4:
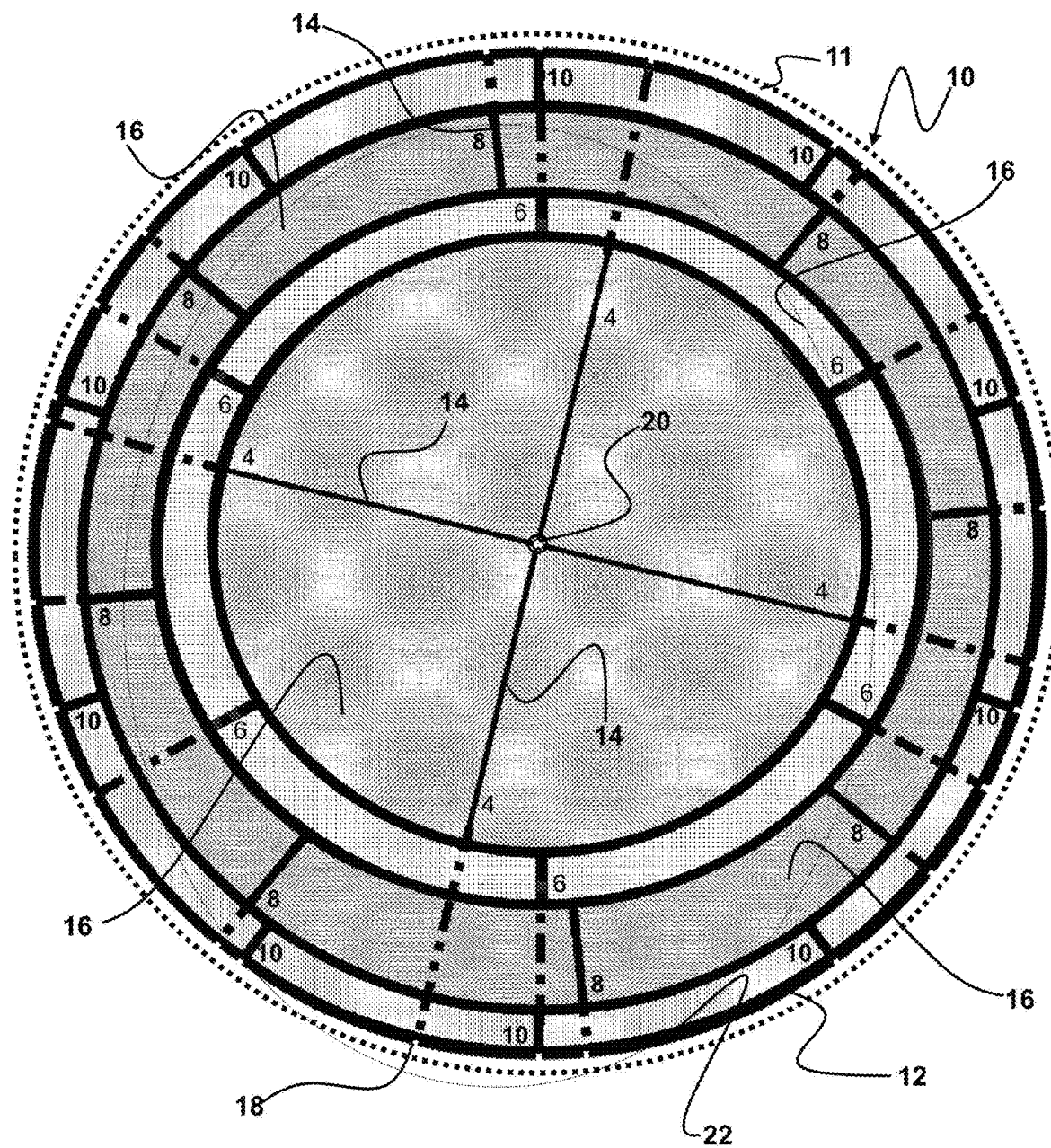
FIG. 4 shows the device in a similar fashion to that of FIG. 3 wherein openings are formed at the intersection of sectional marker lines and the perimeter edge.

As noted, FIGS. 3 and 4 depict the device 10 herein where all of the potential sectional choices for the user are positioned on a single sectioning body 12 formed in annular sections 29, 30, and 31, which surround the central section 25. The sectioning body 12 is, as in other modes of the device 10, substantially planar and may be formed of polymeric material or metal material. A transparent polymeric material is preferable for the sectioning body 12, when formed of polymeric material, to allow the user to see through the sections 16 to the underlying pie or cake for placement thereon. Where metal is used, a screen like material positioned in the sections 16 area will provide a similar see through configuration. The central section 25 may rotate as in FIG. 3 or be stationary as in FIG. 4.

In this mode of the device 10, radially disposed sectioning markers 14 extend from the center 20 of a center section 25 toward the perimeter 22 edge of the sectioning body 12 to define a given number of sections into which the underlying pie or cake will be divided when cut along those lines. The sectioning markers 14 depicted may be formed by structural components, such as elongated members, or by indicia, such as printing upon or positioning decals or the like on the sectioning body 12.

As also shown, openings 18 communicate through the sectioning body 12 in positions along each sectioning marker 14. As with the kit version, the openings 18 are sized for the sliding of position markers, such as toothpicks, therethrough into the underlying cake or pie. The user, thus, may choose the number of sections desired to be cut and employ the sectioning markers 14 marked as such and correlating to the formation of the designated number of sections. Once the toothpicks are inserted into temporary engagement with the underlying pie or cake and the sectioning body 12 lifted therefrom, the inserted markers, such as toothpicks, will define a sectioning for the user to cut the pie or cake and form the desired number of substantially equal sections thereof.

In the mode of the device 10 of FIGS. 3-4, the sectioning body 12 may also be formed with a rotating central section 25, such as is shown in FIG. 3. This will allow the user to rotate the central section 25 to align the sectional sectioning markers 14 therein with the desired number of sections into which the underlying pie or cake will be divided. The rotational engagement 23 may be formed along the exterior circumference of the central section 25 with the inner circumference of the adjacent annular section 29 forming the sectioning body 12. Such a rotational engagement 23 may be, for example, a sliding engagement of the circumferential edge of the central section 25 within a U-shaped race or other sliding engagement formed with the inner circumference of annular section 29 surrounding it. Other rotational engagements for the central section 25 with the surrounding annular section 29 may also be employed so long as the center 20 of the central section 25 remains centered within the exterior circumferential perimeter edge 33 of the sectioning body 12 during any rotation.

While all of the fundamental characteristics and features of the disclosed pie and cake cutting sectioning system herein, have been shown herein, with reference to particular embodiments thereof, a latitude of modification, various changes and substitutions are intended in the foregoing disclosure. It will be apparent that in some instances, some features of the knife sharpening invention may be employed without a corresponding use of other features without departing from the scope of the invention as set forth.

It should also be understood that various substitutions, modifications, and variations may be made by those skilled in the art, upon viewing this disclosure without departing from the spirit or scope of the invention. Consequently, all such modifications and variations and substitutions are considered included within the scope of the invention as defined by the following claims.

What is claimed is:

1. A pie and cake cutting sectioning apparatus, comprising:
   a kit including a plurality of individual sectioning bodies;
   each said sectioning body having a top surface and having a bottom surface adapted for positioning upon a pie or cake;
   each said sectioning body having a radius, said radius extending from a center point thereof to a perimeter edge of said sectioning body;
   a plurality of sectional markers positioned on each said sectioning body, said sectional markers extending radially in between said center point thereof and said perimeter edge thereof;
   each said sectioning body having a plurality of sections thereof, each said section in said plurality of sections defined by a said sectional marker located on opposing sides of said section;
   openings communicating between said top surface and said bottom surface of each said sectioning body;
   said openings positioned along said sectional markers;
   said openings configured for the insertion of a position marker therethrough;
   each said individual sectioning body in said kit having a different number of said sectional markers therein; and
   each said sectioning body in said kit is configured for positioning to a marking position, said marking position having said bottom surface atop a cake or pie whereupon said position markers can be inserted through said openings along said sectional markers to thereby define cutting lines on said pie or cake once said sectioning body is lifted from marking position.

2. The pie and cake cutting sectioning apparatus of claim 1 additionally comprising:
each said sectioning body having perimeter openings positioned on said perimeter edge thereof, said perimeter openings being aligned with said sectional markers.

3. A pie and cake cutting sectioning apparatus, comprising:
a circular sectioning body having a top surface and having a bottom surface adapted for positioning upon a pie or cake;
said circular sectioning body having a radius, said radius extending from a center point of said circular sectioning body to a perimeter edge of said circular sectioning body;
a plurality of sectional markers positioned on said circular sectioning body, said sectional markers extending radially around said center point toward said perimeter edge;
said circular sectioning body having a plurality of sections thereof, each said section in said plurality of sections defined by a said sectional marker located on opposing sides of said section;
openings communicating between said top surface and said bottom surface of said circular sectioning body;
said openings positioned along said sectional markers;
said openings configured for the insertion of a position marker therethrough;
said circular sectioning body having a central section thereof surrounding said center point;
said central section extending to at least one annular section surrounding said central section;
said central section having a first group of said plurality of sectional markers therein;
said annular section having a second group of said plurality of sectional markers extending therein;
said first group of said sectional markers being of a first number thereof which is different than a second number of said second group of said sectional markers; and
said circular sectioning body is configured for positioning to a marking position, said marking position having said bottom surface atop a cake or pie whereupon said position markers can be inserted through said openings along said sectional markers to thereby define cutting lines on said pie or cake once said circular sectioning body is lifted from marking position.

4. The pie and cake cutting sectioning apparatus of claim 3 additionally comprising:
perimeter openings positioned on said perimeter edge of said circular sectioning body, said perimeter openings being aligned with said sectional markers.

5. The pie and cake cutting sectioning apparatus of claim 4 additionally comprising:
said central section being rotationally engaged within said annular section.

6. The pie and cake cutting sectioning apparatus of claim 3 additionally comprising:
said central section being rotationally engaged within said annular section.

\* \* \* \* \*